UNITED STATES PATENT OFFICE.

JOEL A. H. ELLIS, OF SPRINGFIELD, VERMONT, ASSIGNOR TO THE VAPOR-ENGINE COMPANY, OF BOSTON, MASSACHUSETTS.

IMPROVEMENT IN COMPOUNDS FOR VAPOR-ENGINES.

Specification forming part of Letters Patent No. 130,572, dated August 20, 1872; antedated August 10, 1872.

Specification describing a new and Improved Compound for Vapor-Engines, invented by JOEL A. H. ELLIS, of Springfield, in the county of Windsor and State of Vermont.

This invention has for its object to improve the condition of bisulphide of carbon for use in vapor-engines, more particularly with regard to its affinity for oil or other oleaginous matter.

When bisulphide of carbon is used in a vaporized state in engines for imparting motion to the same, it absorbs the lubricating material contained within the engines, and causes thereby considerable friction and wear of parts.

To avoid this, I mix the bisulphide of carbon, previous to vaporizing it, with an ordinary oil, lard, or other oleaginous matter, using about ten per centum of the latter substance.

The aforementioned affinity for oil causes the bisulphide, when evaporated or while evaporating, to absorb sufficient of the oily matter as is necessary to charge it. In this state of composition the vapor is conducted to the engine, where it will not only not absorb any of the lubricating matter, but, on the contrary, aid in the lubrication of all parts with which it comes in contact, and in the keeping the surfaces in polished and perfect condition.

The composition of vaporized bisulphide of carbon with oil is therefore of great value, as it will increase the effectiveness and value of the machinery into which it is conducted.

Another advantage of mixing the bisulphide of carbon with the oil is that it thereby becomes better adapted to absorb and retain heat, and is, consequently, more rapidly vaporized, and longer retained in a vaporous condition, the oil acting as a heat-conveying body to the compound.

Having thus described my invention, I claim as new and desire to secure by Letters Patent—

The composition of bisulphide of carbon and oleaginous matter, to be applied in a vaporized state, as set forth.

JOEL A. H. ELLIS.

Witnesses:
   A. V. BRIESEN,
   T. B. MOSHER.